United States Patent [19]
Beck et al.

[11] Patent Number: 5,138,506
[45] Date of Patent: Aug. 11, 1992

[54] DISK DRIVE LUBRICANT RESERVOIR

[75] Inventors: John L. Beck, Byron; Todd P. Fracek; Nigel F. Misso, both of Rochester; Daniel C. Stucky, Pine Island, all of Minn.

[73] Assignee: International Business Machines Corporaton, Armonk, N.Y.

[21] Appl. No.: 732,958

[22] Filed: Jul. 19, 1991

Related U.S. Application Data

[63] Continuation of Ser. No. 432,940, Nov. 6, 1989, abandoned.

[51] Int. Cl.⁵ .................... G11B 33/14; G11B 5/72
[52] U.S. Cl. .................... 360/97.03; 360/97.02; 428/695
[58] Field of Search .............. 360/97.02, 97.03, 97.04; 428/695

[56] References Cited

U.S. PATENT DOCUMENTS

| | | | |
|---|---|---|---|
| 3,655,441 | 4/1972 | Kefalas | 360/134 |
| 4,315,288 | 2/1982 | Bernett et al. | 360/97.03 |
| 4,489,356 | 12/1984 | Farmer | 360/97.03 |
| 4,789,913 | 12/1988 | Gregory et al. | 360/97.03 |

FOREIGN PATENT DOCUMENTS

| | | | |
|---|---|---|---|
| 0140567 | 11/1981 | Japan | 360/97.03 |
| 0101077 | 6/1984 | Japan | 360/97.03 |

*Primary Examiner*—A. J. Heinz
*Assistant Examiner*—Jefferson Evans
*Attorney, Agent, or Firm*—Robert W. Lahtinen

[57] ABSTRACT

A lubricant reservoir for a vapor transport type rigid magnetic disk drive lubricant system includes a metal heat sink that presents a finned surface at the side exposed to the outside environment. A second surface within the sealed head-disk enclosure cooperates with a thermal heat transfer resisting wall portion to form a duct. A lubricant reservoir is retained against the heat sink surface within the duct. The reservoir assembly is secured to the head-disk enclosure wall by mounting tape that not only seals the enclosure, but thermally isolates the reservoir assembly from the enclosure wall. The reservoir assembly is further positioned adjacent the disk assembly of the drive such that disk rotation induces an air flow through the reservoir duct and in contact with the lubricant reservoir to effect vapor transport between said reservoir and disks to maintain a proper molecular layer of lubricant on the disk surfaces which are always maintained at a temperature greater than the reservoir during disk drive operation.

9 Claims, 4 Drawing Sheets

DISK DRIVE LUBRICANT RESERVOIR

This is a continuation of application Ser. No. 07/432,940 filed Nov. 6, 1989, now abandoned.

FIELD OF THE INVENTION

The invention pertains to a temperature differential vapor transport magnetic disk drive lubrication system and more particularly to an improved lubricant reservoir for such a system.

BACKGROUND OF THE INVENTION

In a magnetic disk storage unit with a self contained source of organic lubricant within the head disk enclosure wherein a recirculating air flow is present. the lubricant molecules bidirectionally transfer between the air stream and the source and between the air stream and the surfaces of the disk media. It is necessary to control the vapor pressure of the lubricant source to provide vapor phase transport of the lubricant molecules between the source and the disk surfaces to maintain a mono-molecular lubricant on the disk surfaces that is within the range of 3 to 15 Angstroms in accordance with the principle of Langmuir Kinetics. The rigid disks have on the recording surfaces a carbon overcoat which has an affinity for airborne organic molecules. Such a system is shown and described in U.S. Pat. No. 4,789,913.

The above vapor transport lubrication system requires that the lubricant supply be kept cooler than each of the disks in the drive during operation.

Summary

The present invention increases the temperature differential between the reservoir and the disks (delta T) compared to previously used designs. If the delta T requirements are not met the resulting off specification operating condition will result in an increased overall failure rate due to increased stiction failures. By enhancing the magnitude and uniform maintenance of the operating delta T between source and disk surfaces. the design of the invention improves the projected failure rates and enables the application of devices with such a lubricating system in a wider range of user environments.

The present lubricant reservoir assembly design maintains the reservoir cooler than the disks during all file operation without any power requirements. This design includes the reservoir, a high efficiency particulate air (HEPA) paper impregnated with lubricant. HEPA paper treated in this manner provides a bulk storage medium for the lubricant which in time does not inhibit the transfer of lubricant to the air stream. A moldable fluorocarbon plastic wall between the disks and reservoir to increase thermal resistance and provide a non wetting surface beneath the reservoir to prevent bulk transfer of the lubricant if the temperature of the reservoir exceeds the melting point of the lubricant. Airflow entry fins which are connected to the heat sink are provided at the entry to the reservoir cavity prior to air contact with the lubricant supply. A metal heat sink is in contact with the external environment and isolated from the balance of the disk enclosure. The lubricant reservoir is in near direct contact with the heat sink for maximum heat transfer. A fluorocarbon film (tape liner) surface between the heat sink and the reservoir prevents the lubricant from "wetting" the heat sink while providing minimal thermal resistance. This position in near direct contact with the heat sink minimizes the thermal gradient along the reservoir in the direction of internal and external air flows. This prevents migration of the lubricant which would reduce the mass transfer surface area of the reservoir. The assembly is designed for fabrication by economical molding techniques and incorporates a bridge-like structure with side and center rails that assures that the reservoir assembly is held in intimate, thermal contact with the metal heat sink and is less susceptible to damage than the other elements of the disk drive.

Detailed Description

Figure 1:
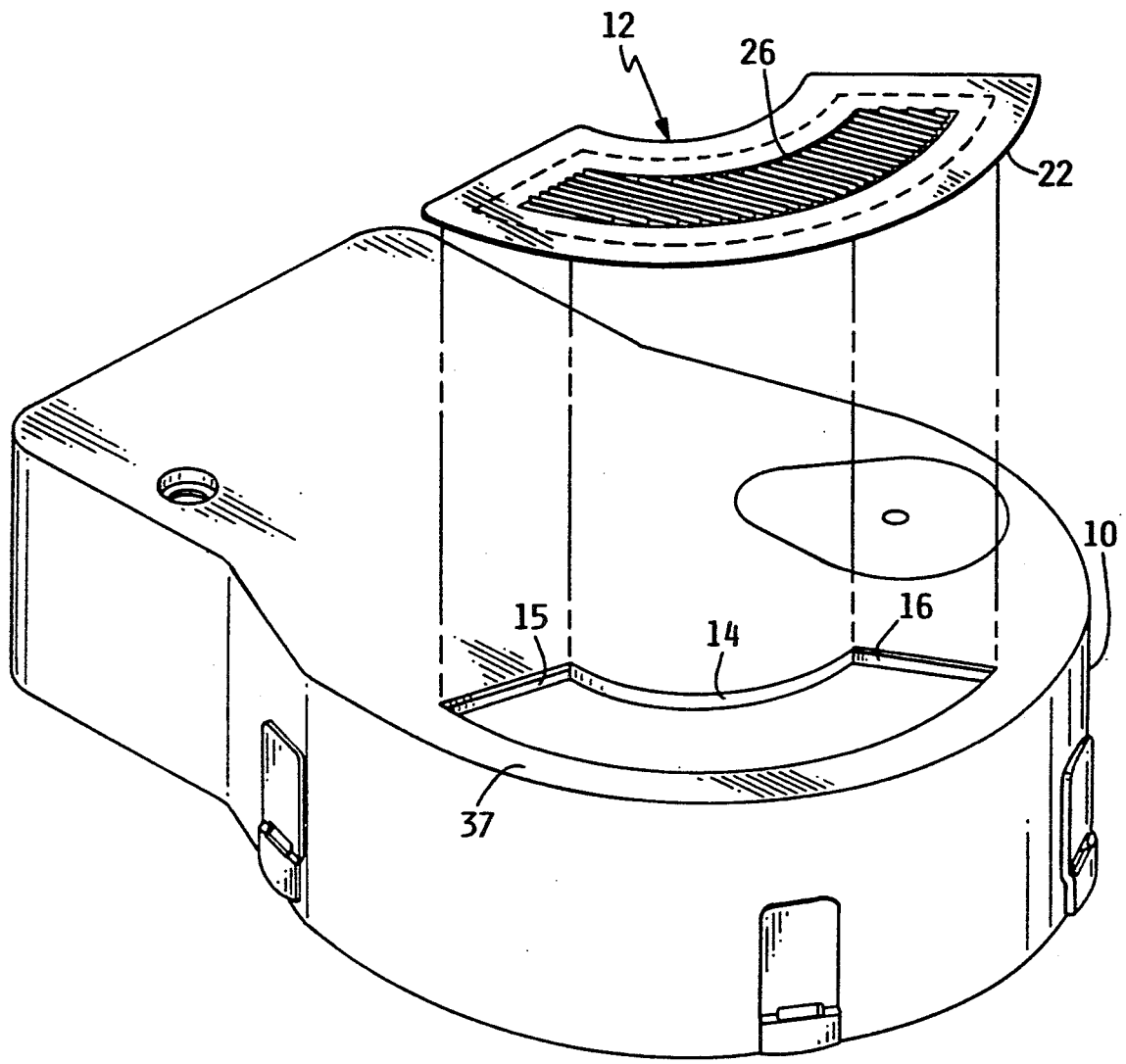
FIG. 1 is an exploded view showing the reservoir assembly of the present invention and a cooperating disk drive cover member.

FIG. 1 shows a typical disk drive enclosure cover in the form of a drawn metal part which cooperates with a cast base member (not shown) to enclose and seal the head disk assembly of the magnetic disk storage device. The reservoir assembly 12 is shown removed from the cover recess 14 in which it is mounted. The recess 14 is a debossed portion of cover 10 with slotted openings 15, 16 through which the air within the enclosure is received and exhausted respectively during operation when an air flow is induced through the reservoir assembly 12. This flow of air enables transport of the reservoir lubricant vapors into the disk enclosure for proper disk lubrication treatment.

The cover 10 cooperates with a frame to form a sealed enclosure about a disk-spindle assembly and actuator assembly. The disks are supported by a hub, separated by spacers and retained by a clamp which is secured to the hub by a series of screws. The spindle-disk assembly is mounted on a spindle shaft for rotation in unison therewith. A slider with a transducer carried thereby confronts each radially extending disk data surface. Each slider 54 is attached to a suspension 54 by a gimbel mounting and each suspension is carried by an actuator arm, with the actuator arms extending between disks each carrying two suspensions. The arms are secured together as an assembly that rotates about the axis of an actuator shaft. Actuator motion is generated by a voice coil motor including a stationary assembly of permanent magnets and pole pieces within frame that create a magnetic field within a working gap in which a voice coil, attached to the pivotable actuator assembly, is positioned. The actuator moves in one direction of rotation about the axis when a DC current is passed through the voice coil in one direction and moves in the opposite direction of rotation when the direction of DC current in the voice coil is in the opposite direction.

Figure 2:
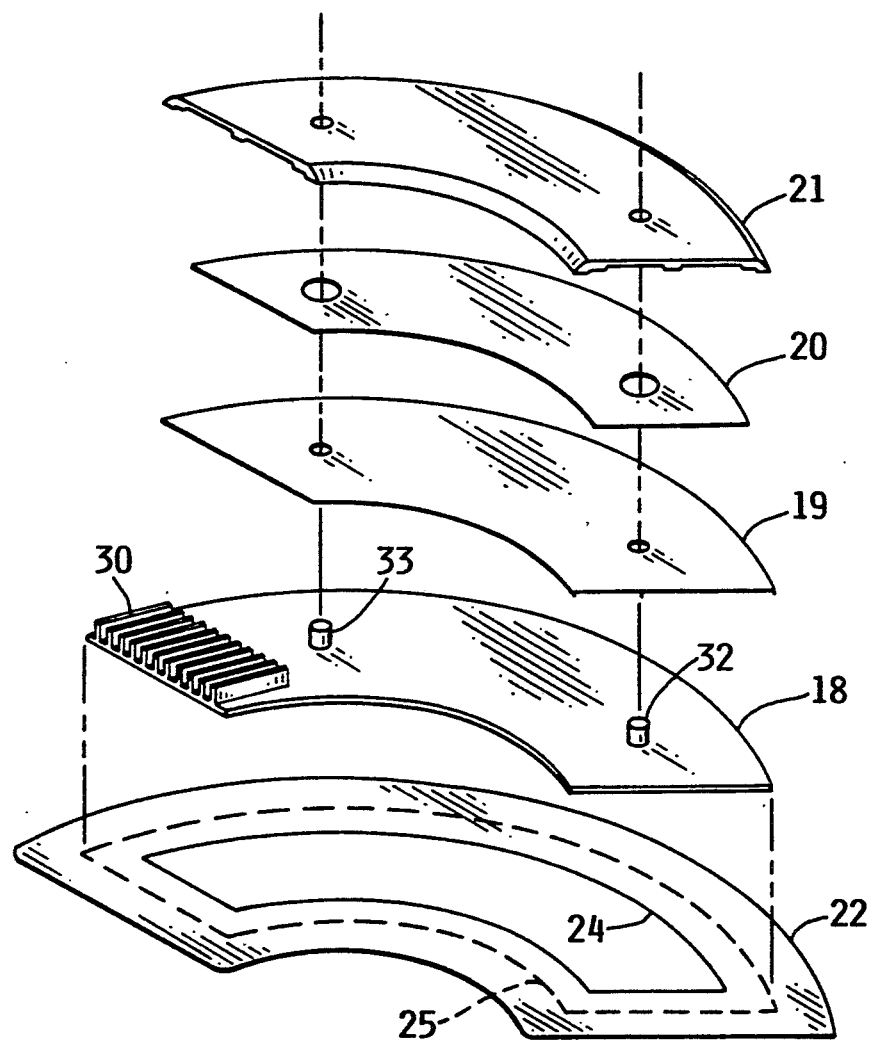
FIG. 2 is an exploded view of the lubricant reservoir of FIG. 1 in an inverted position.
Figure 3:
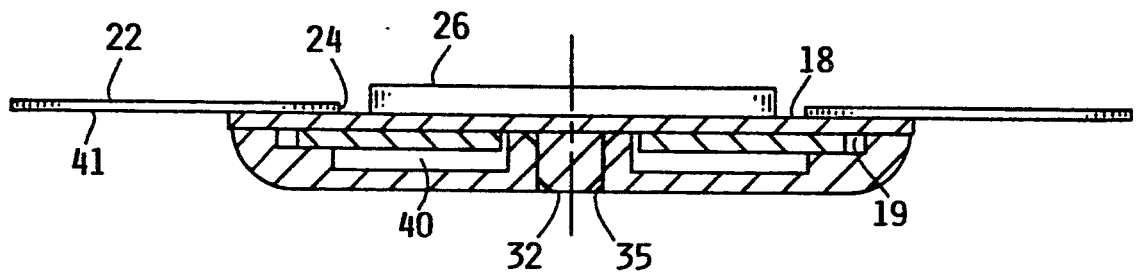
FIG. 3 is a section view of the assembled reservoir of FIG. 2 taken through the axis of the heat sink pin adjacent the outlet of the assembly duct.

The reservoir assembly 12 includes five parts as illustrated in the exploded view of FIG. 2; the metal heat sink 18, a fluorocarbon tape liner 19, the reservoir 20 which is treated with disk lubricant, a moldable fluorocarbon carrier 21 and the mounting tape 22. The view of FIG. 2 shows the reservoir assembly inverted. The carrier 21 projects downward into the cover recess 14 in the assembled condition. The view of FIG. 3 shows the heat transfer fins 26 on surface 27 of the heat sink project through the opening 24 in mounting tape 22 to provide an extended heat transfer surface exterior to the sealed head-disk enclosure. The dotted line 25 shown on the surface of tape member 22 identifies the boundary between the heat sink 18 and cover 10 in the assembled condition. The surface of the tape element within dotted line 25 is adhered to the lower, concealed surface of the heat sink 18 and the tape surface outside dotted line 25 is adhered to the cover 10 to thereby seal the reservoir assembly to the cover 10 and also provide a poor thermal contact between the cover and reservoir assembly.

Figure 5A:
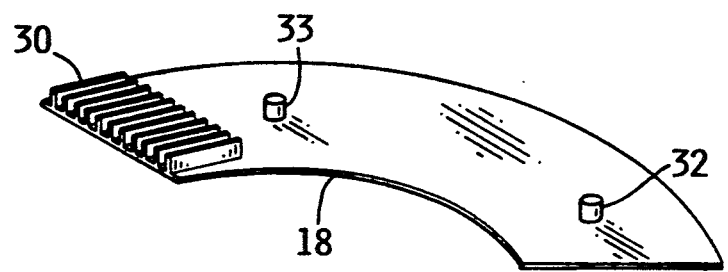
FIGS. 5A and 5B respectively show the lower and upper surfaces of the heat sink and the extended surfaces provided by the respective series of integral fins.
Figure 5B:
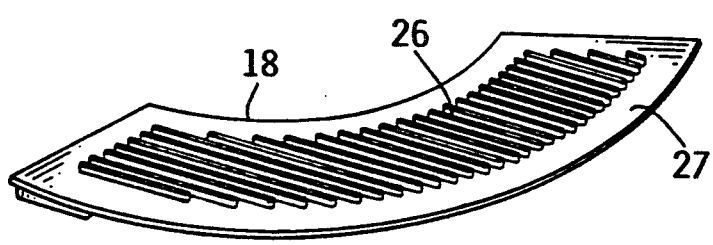

FIG. 5A shows the metal heat sink 18 with fins 30 adjacent the inlet opening of the reservoir on the internal side and aligned with such reservoir opening to provide an extended surface communicating with the environment inside the head-disk enclosure. In addition a pair of pins 32. 33 formed as an integral part of the heat sink 18 provide positioning support and alignment for the other portions of the reservoir assembly. The fins 26 on the external surface 27 as shown in FIG. 5B provide an extended surface communicating with the environment outside the head-disk enclosure.

The view of FIG. 3 is a section of the assembled reservoir taken through the pin 32 illustrating how the pin 32 is received through holes 35 in the carrier 21 to align and secure the parts of the reservoir assembly and form a bridge structure that gives the assembly strength and rigidity. The fluorocarbon tape 19 is secured to the heat sink 18. The carrier 21 is secured to the heat sink by a force fit between pin 32 and carrier opening 35. The mounting tape 22 is adhered to both the heat sink 18 surface 27 and the enclosure cover 10 surrounding the debossment 14.

Figure 4:
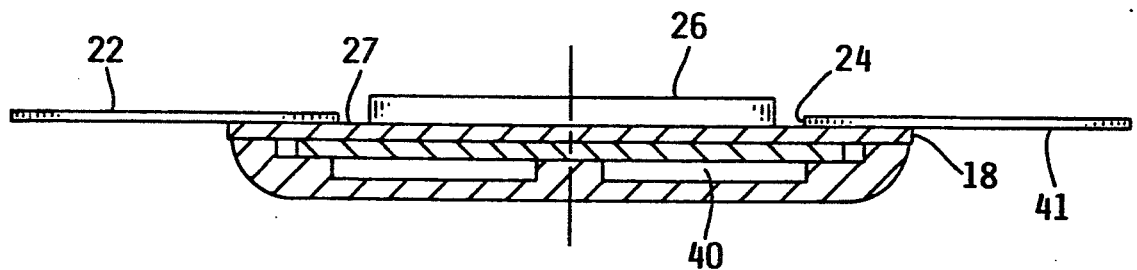
FIG. 4 is another section view of the assembled reservoir assembly.

FIG. 4 is another section view of the assembly which shows the air flow passage 40. The portion of the reservoir assembly below the mounting tape surface 41 is received in the cover recess 14.

The lubricant utilized in the vapor transport system is a solid material at normal operating temperatures. The molecular transfer between the reservoir and the disk surfaces occurs by sublimation of the lubricant material into the recirculating air flow. The reservoir 20 is supported within the reservoir assembly between the tape line 19 and carrier 21 which include surfaces that form the surrounding air duct. The tape liner 19 and carrier 21 are both formed of fluorocarbon materials that present "non wetting" surfaces confronting reservoir 20. If the temperature of the reservoir assembly should be elevated sufficiently to cause the lubricant to become liquid. the "non wetting" surfaces will cause the lubricant to be retained by reservoir 20.

When the disks of the disk storage unit are rotated during operation, a flow of air is induced which is received through the cover opening 15 and over the fins 30 at the entrance to the reservoir assembly. Here the air is cooled by the heat sink fins 30 and then progresses through the passage 40 between heat sink 18 and carrier 21 and over the cooler reservoir 20. The air containing lube molecules in the vapor phase continues to outlet of the reservoir assembly and through cover slot 16 back to the principal portion of the head-disk enclosure to provide the proper mono molecular layer of lubricant on the disk surfaces.

By using the reservoir-heat sink assembly 12 as described, the heat dissipation is increased at the reservoir location to achieve a higher delta T or temperature differential between the disks and the bulk lubricant reservoir. The increased delta T enhances the functioning of the vapor transport lubrication system and extends the range of environments wherein the system functions effectively.

While this invention has been particularly described with reference to a preferred embodiment, it will be understood by those skilled in the art that various changes in detail may be made therein without departing from the spirit and scope of the invention.

What is claimed is:

1. In a magnetic disk information storage device which includes a rigid disk enclosure, a lubricant reservoir comprising a base member that functions as a heat sink having an extended heat transfer surface at one side, porous, lubricant containing reservoir material in heat transfer proximity to a second surface of said base member opposite said one side and separated from said second surface by a film of material that is not wettable by lubricant retained in said reservoir material, said film having marginal surfaces extending beyond said reservoir material, wall means cooperating with said base member to form a duct, substantially defined by said wall means and said reservoir material, having an inlet opening and an outlet opening, and means for attaching said base member to said enclosure to position said heat transfer surface exterior of said enclosure and said inlet opening and said outlet opening within the enclosed volume of said enclosure.

2. The lubricant reservoir of claim 1 wherein said base member includes a series of fins projecting from said second surface adjacent said inlet opening.

3. The lubricant reservoir of claim 2 wherein said inlet opening and said outlet opening are positioned with respect to the disks of said storage device to cause disk rotation to induce a flow of air through said duct.

4. In a magnetic disk information storage device which includes a rigid disk enclosure member, a lubricant reservoir comprising a base member that functions as a heat sink and includes an extended surface heat transfer portion on one surface;

a lubricant reservoir of porous material retained in heat transfer proximity with a second surface of said base member opposite said one surface and separated from said second surface by a film of material that is not wettable by lubricant retained in said reservoir, said film having marginal surfaces which extend beyond the area of contact with said reservoir material, a wall portion which cooperates with said base member to form a duct with inlet and outlet openings within said enclosure; and means securing said base member along said enclosure wall portion with said extended surface heat transfer portion exterior of said rigid disk enclosure and said lubricant reservoir in communication with the interior of said rigid disk enclosure.

5. The lubricant reservoir of claim 4 wherein said base member is formed of metal and said second wall portion is formed of heat transfer resistant. moldable plastic material.

6. The lubricant reservoir of claim 5 wherein said base member, lubricant reservoir and second wall portion form a reservoir assembly and said assembly is secured to and thermally isolated from said enclosure wall portion.

7. The lubricant reservoir of claim 6 wherein said reservoir assembly is secured to said enclosure wall portion by a mounting tape that provides a seal between said assembly and said enclosure wall portion and thermally isolates said reservoir assembly from said wall portion.

8. The lubricant reservoir of claim 6 wherein said enclosure wall portion has a debossed portion in which said reservoir assembly is received, said debossed portion having a pair of slotted openings respectively aligned with the inlet and outlet openings of said reservoir assembly duct.

9. The lubricant reservoir of claim 8 wherein said slotted openings and said duct inlet and outlet openings are positioned such that disk rotation within said head-disk enclosure induces an air flow through said duct.

* * * * *